US006991411B2

(12) United States Patent
Irion et al.

(10) Patent No.: US 6,991,411 B2
(45) **Date of Patent: *Jan. 31, 2006**

(54) DEVICE FOR CLAMPING TOOLS

(75) Inventors: Ingo Irion, Schwanau (DE); Michael Voss, Leonberg (DE)

(73) Assignees: Innovat Gesellschaft fuer Sondermaschinenbau, Messund Steuertechnik mbH, (DE); Bilz Werkzeugfabrik GmbH & Co. KG, (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/780,200

(22) Filed: Feb. 17, 2004

(65) Prior Publication Data

US 2004/0160020 A1 Aug. 19, 2004

Related U.S. Application Data

(63) Continuation of application No. 09/958,704, filed as application No. PCT/EP00/02123 on Mar. 20, 2000, now Pat. No. 6,712,367.

(30) Foreign Application Priority Data

Apr. 6, 1999 (DE) ................................ 199 15 412

(51) Int. Cl.
*B23P 11/02* (2006.01)
*H05B 6/14* (2006.01)

(52) U.S. Cl. ........................ 409/234; 279/102; 29/447; 219/635; 219/674

(58) Field of Classification Search ................ 279/102, 279/158; 409/234; 219/201, 221, 635, 674, 219/676; 29/447, 800; 432/224, 225, 227, 432/331

See application file for complete search history.

(56) References Cited

U.S. PATENT DOCUMENTS

| | | | | |
|---|---|---|---|---|
| 5,041,806 | A | 8/1991 | Enderle et al. | |
| 5,311,654 | A | 5/1994 | Cook | |
| 6,060,694 | A * | 5/2000 | Hauser | 219/221 |
| 6,216,335 | B1 * | 4/2001 | Freyermuth | 29/701 |

(Continued)

FOREIGN PATENT DOCUMENTS

CH 29 334 A 8/1904

(Continued)

OTHER PUBLICATIONS

Request for cancellation of German derivation 200 08 675 of PCT/EP00/02123 (and cited documents).

(Continued)

*Primary Examiner*—Daniel W. Howell
(74) *Attorney, Agent, or Firm*—Pendorf & Cutliff

(57) ABSTRACT

The invention is concerned with a device for clamping and releasing work tools (16) in a tool receptacle (10). The tool receptacle (10) includes on its free end for this purpose an open socket part (12), which is adapted for frictional engaging reception of the work tool shaft (14). The work tool shaft is thereby shrunk-fit into a borehole (20) in the socket part (12). For this purpose the socket part is provided with an induction coil (26) encircling the tool receptacle (10) which coil can be acted upon by high frequency alternating current for producing heat and heating the socket part (12). For avoidance of leakage fields which could result in a undesired heating of the work tool (16), it is proposed in accordance with the invention that the induction coil (26), on its surface adjacent the free end of the socket part (12), is covered over by a pole shoe (34) having a central through hole (36) for the work tool (16) and comprised of a magnetically conductive and electrically non-conductive material.

29 Claims, 1 Drawing Sheet

U.S. PATENT DOCUMENTS

| | | | | |
|---|---|---|---|---|
| 6,680,466 | B2 * | 1/2004 | Rabe | 219/635 |
| 6,712,367 | B1 * | 3/2004 | Irion et al. | 279/102 |
| 6,755,228 | B2 * | 6/2004 | Kelch | 156/499 |
| 6,822,206 | B2 * | 11/2004 | Haimer | 219/635 |
| 2003/0168445 | A1 * | 9/2003 | Haimer | 219/643 |

FOREIGN PATENT DOCUMENTS

| | | | |
|---|---|---|---|
| DD | 96 427 | A | 3/1978 |
| DE | 39 25 641 | C2 | 3/1989 |
| DE | 297 05 185 | U1 | 3/1997 |
| DE | 298 20 838 | U1 | 11/1998 |
| DE | 10218292 | * | 11/2003 |
| DE | 10255362 | * | 3/2004 |
| EP | 0 406 782 | A | 1/1991 |
| EP | 1314511 | * | 11/2002 |
| FR | 1524221 | | 4/1968 |
| JP | 2001-18128 | * | 1/2001 |

OTHER PUBLICATIONS

*Induktive Erwärmung,* Physikalische Grundlagen und technische Anwendungen, 4. vollstandig überarbeitete Auflage 1991.

*Shrinker Tooling Innovations, A True Breakthrough in Toolholding Technology,* Dec. 1996.

*Production and Concentration of Magnetic Flux for More Efficient Induction Heating Applications,* R.S. Ruffini and Robert J. Madiera, Industrial Heating, Feb. 1989.

*Materials for Effective Magnetic Flux Control and Concentration in Induction Heating Processes,* R.S. Ruffini et al., Industrial Heating, Nov. 1996.

*Production and Concentration of Magnetic Flux for Induction (Eddy Current) Heating Applications,* R.S. Ruffini, Industrial Heating, Nov. 1994.

*Essay of Martin Eastman* "Shrink-Fit Toolholding", Zeitschrift Cutting Tool Engineering, Apr. 1997, Seiten 76 bis 83.

*Magnetic Flux Concentrators: Myths, Realties, and Profits,* Dr. Valery Rudnev et al, Metal Heat Treating, Mar./Apr. 1995.

*Taschenbuch der Hochfrequenztechnik,* H. Meinke et al, Dritte verbesserte Auflage, 1968.

Soviet Inventions Illustrated, Section P, Q: General/Mechanical, Derwent Publications Ltd, UK 1983.

Opposition again European Patent 1 165 284.

Infringement suit against the firm GEWEFA Josef C. Pfister GmbH & Co. Präzisionswerkzeugfabrik with cited documents.

* cited by examiner

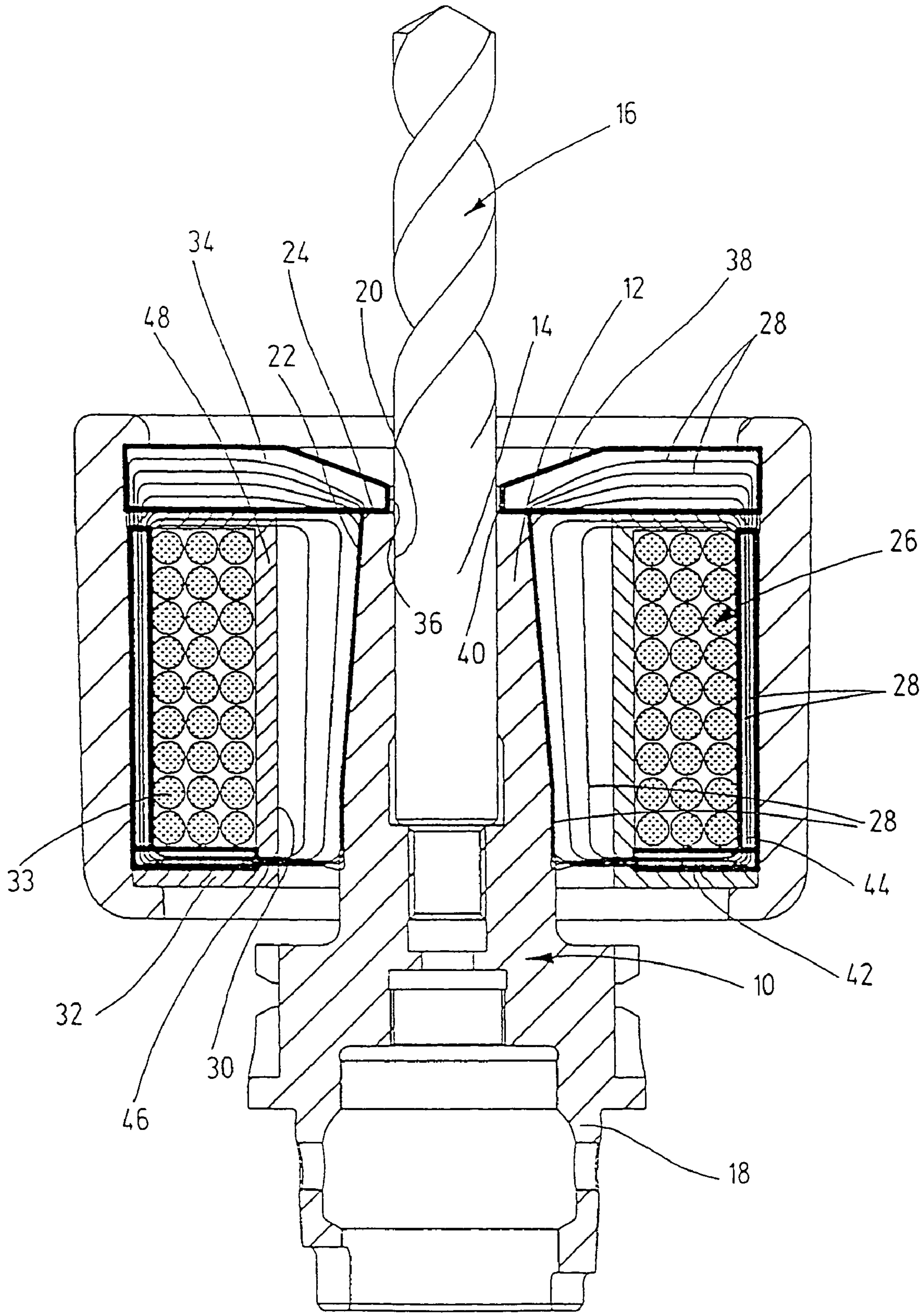
16
34
24
20
38
12
28
48
14
22
26
36
40
28
28
33
44
10
42
32
30
46
18

DEVICE FOR CLAMPING TOOLS

RELATED APPLICATIONS

The present application claims the benefit of U.S. patent application Ser. No. 09/958,704, filed on Oct. 9, 2001, which issued as U.S. Pat. No. 6,712,367 on Mar. 30, 2004 entitled "DEVICE FOR CLAMPING TOOLS", which was a national stage of PCT/EP00/02123 filed Mar. 10, 2000 and based upon DE 199 15 412 filed Apr. 6, 1999 under the International Convention, the specification of which is hereby incorporated in its entirety by reference.

BACKGROUND OF THE INVENTION

1. Field of the Invention

The invention concerns a device for clamping and releasing a tool having a tool shaft, the device including a tool receptacle having on its free end an open socket part of an electrically conductive material for receiving the tool shaft with frictional engagement, and with a ring or cylindrical coil shaped induction coil surrounding the socket part of the tool receptacle, which coil can be energized with a preferably high frequency alternating current.

2. Description of the Related Art

Devices of this type are intended to be used for example for clamping or releasing a tool in the form of a milling cutter or drill in the tool receptacle. For this, the tool receptacle is heated in the area of the socket part with the aid of the induction coil, so that the borehole of the socket part expands. The tool is then introduced via its shaft into the heating-enlarged receptacle. During the subsequent cooling of the socket part, the tool shaft is frictionally held in the borehole of the socket part which shrinks as it cools. The diameter of the tool shaft and the socket part are therein so selected, that upon cooling a form-fitting connection results which is fixed against rotation, and which is not released even due to centrifugal forces during rapid rotation. For de-tensioning, the socket part is warmed again via the induction coil, until the tool can be pulled out of the receptacle. The de-tensioning is only possible because the heating spreads from outside towards inwards, so that first the socket part is warmed, prior to the warmth reaching the tensioned tool part. Thereby it is achieved, that first the socket segment expands, so that the still cooler tool can be released out of the receptacle during de-tensioning. This however functions only when the employed tool has low thermal coefficient of expansion and/or low electrical conductivity, for example hardened metal or ceramic. In the case of employment of insertion tools made of tool steel, there are however always problems during de-tensioning.

SUMMARY OF THE INVENTION

The invention is thus concerned with the task of further developing the known device of the above described type in such a manner that even tools with a large thermal coefficient of expansion and/or comprised of electrically conductive material can reliably be clamped and released with the aid of induction heating.

The inventive solution is based upon the recognition, that tools of electrically conductive material are heated so rapidly by the not insignificant field of the conventional induction coil in the vicinity of the clamping area, so that the de-tensioning is made difficult or impossible. In order to prevent this, in accordance with the invention it is proposed to reduce the electromagnetic fields in the area of the free end of the socket part to such an extent that a heating of the tool situated in the tool receptacle is prevented. In accordance with the invention this is achieved thereby, that the induction coil is covered over by a pole shoe on its end surface adjacent the free end of the socket part, the pole shoe exhibiting a central opening for the tool and comprised of a magnetically conductive and electrically non-conductive material. By this means it is achieved, that the magnetic field lines are concentrated in the pole shoe on the concerned surface of the induction coil, so that also the part of the tool extending beyond the tool receptacle is effectively shielded against electromagnetic flux or leakage fields.

A particularly effective shielding is achieved thereby, that the pole shoe partially overlaps the free end of the socket part and lies axially and/or radially against the free end of the socket part. The through-hole opening in the pole shoe exhibits a greater dimension than the tool diameter, so that an air gap with high magnetic resistance exists in the direction of the tool. A further improvement in this respect is achieved thereby, that the pole shoe exhibits a cross-section which narrows partially in the direction towards the opening.

The pole shoe can be formed as a ring disk, which exhibits a concentrically conical fluting or groove towards the opening. Basically it is also possible to form the pole shoe of multiple, spoke-like arranged radial segments.

In order to achieve a rapid as possible warming of the socket part with as low as possible electrical consumption, it is proposed in accordance with a further preferred embodiment of the invention, that the induction coil further includes on its surface opposite to the pole shoe and/or on its outer circumference surface supplementally a magnetic shield of magnetic conductive and electrically non-conductive material. The face of the magnetic shield can be formed as a ring disk with a through hole for the tool receptacle of the socket part. Alternatively to this, the face of the magnetic shield can also be formed of multiple spoke-arranged radial segments. The outer circumference or casing outer-side shield is preferably formed as a cylindrical cage, which is either closed in the circumference direction or can be comprised of multiple axially parallel segments arranged spaced apart from each other in the circumference direction.

For better centering of the induction coil with respect to the socket part it is of advantage, when the pole shoe includes a concentric, ring shaped sintering shoulder for receiving the free end of the socket part and/or for supporting the ring opening of the induction coil.

In order to keep the current strength as low as possible for a pre-determined amount of heat production, it is proposed in accordance with a further preferred embodiment of the invention, that the induction coil includes a preferably multi-layer wound coil winding of a high frequency stranded conductor. It has found that, in this case, the otherwise conventional water cooling of the coil winding can be dispensed with. Since the heating process only requires a few seconds, generally convection cooling via the ambient air suffices. At higher power settings the coil winding can be cooled as necessary by forced air.

The induction coil preferably includes a coil body or bobbin of a ceramic material, which can in addition be used as carrier for the pole shoe and/or the magnetic shield.

Tests have shown that the outer circumference part is heated less rapidly in the vicinity of its free end than in the central area. In order to avoid gap problems, it is thus of advantage, when the socket part includes a registry or fitting borehole for receiving the tool shaft, which is in communication towards its free with a segment of larger diameter. The socket part can exhibit a cylindrical or barrel shaped outer surface.

The tool receptacle could on the one hand be provided directly on a rapidly rotating machine spindle. Alternatively thereto, the tool receptacle can carry a coupling element which carries the socket part and is connectable with a rapidly rotating machine spindle.

The tool receptacle and the induction coil are associated in the above-described orientation for the purpose of coupling and de-tensioning procedures. In order to make possible a simple operation, it is of advantage when the tool receptacle and the induction coil are moveable relative to each other.

BRIEF DESCRIPTION OF THE DRAWING

In the following the invention will be described on the basis of a illustrative embodiment represented schematically in the drawing. The single FIGURE shows a section through a device for coupling and releasing a tool in a tool receptacle with a heating device formed as an induction coil.

DETAILED DESCRIPTION OF THE INVENTION

The tool receptacle 10 shown in the drawing includes a socket part 12 open towards its free end for the frictional reception of the tool shaft 14 of a tool 16 formed as a spiral milling cutter or drill. The tool receptacle 10 in the illustrated embodiment is formed as an adapter, which on its rear end includes a coupling element 18 in the form of a hollow shaft with conical or tapered outer surface for the connection to a—not shown—rapidly rotating machine spindle. The socket part 12 includes a fitting borehole 20 for the cylindrical work tool shaft 14 as well as a truncated conical shaped outer surface 22. On its end, the socket part 12 is bordered by circumscribing ring surface. The diameter of the fitting borehole has a smaller dimension than the tool shaft 14 at ambient temperature. The clamping and release of the work tool 16 is thus possible at elevated temperature of the socket part 12 up to about 450° C.

The warming of the socket part 12 occurs with the aid of an induction coil 26, which is acted upon by a high frequency alternating current. The socket part 12 is comprised for this purpose of an electric conductive material, in which the field lines 28 of the induction coil 26 penetrate into the outer circumference area and cause a temperature elevation by production of an eddy current. The tool receptacle is for this purpose introduced with its outer surface or outer circumference part 12 in the central opening 30 of the induction coil 26 which is in the form of a cylindrical coil. The induction coil includes a bobbin or coil body 32 comprised of a ceramic material. Upon the coil body there is situated a multi-layer winding 33 of high frequency conductive stranded conductor, which is acted upon by the high frequency alternating current. The induction coil 26 is closed off on the end adjacent the free end of the socket part 12 by a pole shoe 34 laid upon the coil body 32, which pole shoe is comprised of a magnetically conductive and electrically non-conductive material which exhibits a central opening 36 for the insertion of the tool 16. In the illustrated embodiment the pole shoe 34 is formed as a ring disk, which partially overlaps the ring surface of the socket part 12 from outside and which exhibits a conical recess 38 extending towards the central opening 36. The pole shoe 34 lies upon the ring surface and borders towards the work tool shaft .14 with a magnetic resistance increasing ring shaped air gap 40. By this means it is achieved that the field lines 28 coming from the coil winding 33 are concentrated in the pole shoe 34 and are conducted directly via the ring surface into the socket part 12. The part of the work tool 16 projecting beyond the ring surface of the socket part 12 is in this manner effectively shielded from the electro-magnetic flux. Thereby it is achieved, that also tools made of electrically conductive material, for example tool steel, can be employed, without being heated by the electro-magnetic flux. Finally, this is also necessary in order to make possible a reliable de-tensioning.

For further improvement of effectiveness, the induction coil 26 is provided on its end surface lying opposite the pole shoe 34 and also on its cylindrical outer surface respectively with a magnetic shield 42, 44 of magnetically conductive and electrically non-conductive material. The magnetic shield 42 on the end surface opposite the shoe pole side is thereby formed as a ring disk with a through hole 46 for the inner wall 48 of the coil body 32 provided, while the outer circumference side shield 44 is formed as a cylindrical cage. The field lines 28 are concentrated in the shields 42, 44, so that the flux loss is minimized. The pole shoe 34 and the shield 42, 44 are comprised of a soft magnetic, in particular a soft ferritic ceramic oxide material, in which little or no flux loss occurs due to the electrically insulating characteristic.

The tool receptacle 10 and the induction coil 26 are moveable relative to each other for the clamping and releasing of the work tool. Besides the heating station, which includes the induction coil 26, there is preferably provided a not shown cooling station, in which the tensioning process can be accelerated.

In summary the following can be concluded: The invention is concerned with a device for clamping and releasing work tools 16 in a tool receptacle 10. The tool receptacle 10 includes for this purpose on its free end an open socket part 12, which is adapted for receiving the work tool shaft 14 with frictional engagement. The work tool shaft is thereby shrink-fitted into a borehole 20 in the socket part 12. For this purpose the socket part is provided with a tool receptacle 10 surrounding induction coil 26 which can be acted upon by high frequency alternating current for heating the socket part 12. For avoidance of leakage or flux fields, which could result in a undesired heating of the work tool 16, it is proposed in accordance with the invention, that the surface of the induction coil 26 adjacent the free end of the socket part 12 is covered over by a pole shoe 34 having a central through-hole 36 for the work tool 16 and comprised of a magnetically conductive and electrically non-conductive material.

What is claimed is:

1. A device for clamping and releasing a work tool (16) in a work tool receptacle, the work tool having a work tool shaft (14), the device including:

the work tool receptacle (10) including a socket part (12) open on its free end (24) and comprising electrically conductive material adapted for frictionally engaging reception of the tool shaft (14), and an induction coil (26) in the form of a ring or cylindrical coil having a first end adjacent the free end of the socket part, a second end opposite the free end of the socket part, and an outer surface, said induction coil encircling the socket part (12) of the tool receptacle (10) and adapted for heating the socket part (12) when energized with high frequency alternating current, wherein the first end of the induction coil (26) adjacent the free end of the socket part (12) is closed off by a pole shoe (34) exhibiting a central through-hole (36) for the tool (16) and comprised of a magnetically conductive and electrically non-conductive material, and wherein the pole shoe (34) partially overlaps the free end (24) of the socket part (12).

2. A device according to claim 1, wherein the pole shoe (34) lies axially and/or radially against the free end of the socket part (12).

3. A device for clamping and releasing a work tool (16) in a work tool receptacle, the work tool having a work tool shaft (14), the device including:

the work tool receptacle (10) including a socket part (12) open on its free end (24) and comprising electrically conductive material adapted for frictionally engaging reception of the tool shaft (14), and an induction coil (26) in the form of a ring or cylindrical coil having a first end adjacent the free end of the socket part, a second end opposite the free end of the socket part, and an outer surface, said induction coil encircling the socket part (12) of the tool receptacle (10) and adapted for heating the socket part (12) when energized with high frequency alternating current, wherein the first end of the induction coil (26) adjacent the free end of the socket part (12) is closed off by a pole shoe (34) exhibiting a central through-hole (36) for the tool (16) and comprised of a magnetically conductive and electrically non-conductive material, and wherein the pole shoe (34) lies axially and/or radially against the free end of the socket part (12).

4. A device according to claim 3, wherein the through-hole (36) of the pole shoe (34) is larger in dimension than the tool shaft diameter.

5. A device according to claim 3, wherein the pole shoe exhibits a cross section which tapers partially in the direction of the through hole (36).

6. A device according to claim 3, wherein the pole shoe (34) is a ring disc.

7. A device according to claim 6, wherein the ring disc includes a conical recess which is concentric with the through hole (36).

8. A device for clamping and releasing a work tool (16) in a work tool receptacle, the work tool having a work tool shaft (14), the device including:

the work tool receptacle (10) including a socket part (12) open on its free end (24) and comprising electrically conductive material adapted for frictionally engaging reception of the tool shaft (14), and an induction coil (26) in the form of a ring or cylindrical coil having a first end adjacent the free end of the socket part, a second end opposite the free end of the socket part, and an outer surface, said induction coil encircling the socket part (12) of the tool receptacle (10) and adapted for heating the socket part (12) when energized with high frequency alternating current, wherein the first end of the induction coil (26) adjacent the free end of the socket part (12) is closed off by a pole shoe (34) exhibiting a central through-hole (36) for the tool (16) and comprised of a magnetically conductive and electrically non-conductive material, wherein the pole shoe (34) is a ring disc, and wherein the ring disc exhibits a cross section which tapers partially in the direction of the through hole (36).

9. A device according to claim 8, wherein the pole shoe (34) is formed of multiple radial segments arranged as spokes.

10. A device for clamping and releasing a work tool (16) in a work tool receptacle, the work tool having a work tool shaft (14), the device including:

the work tool receptacle (10) including a socket part (12) open on its free end (24) and comprising electrically conductive material adapted for frictionally engaging reception of the tool shaft (14), and an induction coil (26) in the form of a ring or cylindrical coil having a first end adjacent the free end of the socket part, a second end opposite the free end of the socket part, and an outer surface, said induction coil encircling the socket part (12) of the tool receptacle (10) and adapted for heating the socket part (12) when energized with high frequency alternating current, wherein the first end of the induction coil (26) adjacent the free end of the socket part (12) is closed off by a pole shoe (34) exhibiting a central through-hole (36) for the tool (16) and comprised of a magnetically conductive and electrically non-conductive material, and wherein the pole shoe (34) is formed of multiple radial segments arranged as spokes.

11. A device according to claim 10, wherein the induction coil (26) on its side opposite the pole shoe and/or on its outer surface is provided with a magnetic shield (42, 44) of a magnetically conductive and electrically non-conductive material.

12. A device according to claim 11, wherein said magnetic shield (42) at the side opposite the pole shoe is formed as a ring disk with a through hole (46) for insertion of the socket part (12) of the tool receptacle (10).

13. A device according to claim 11, wherein said magnetic shield (42) provided at the side opposite the pole shoe is formed of multiple radial segments arranged like spokes.

14. A device according to claim 11, wherein the shield (44) at the outer surface of the induction coil is in the form of a cylindrical cage.

15. A device according to claim 14, wherein the cylindrical cage is closed in the circumferential direction.

16. A device according to claim 14, wherein the cylindrical cage is comprised of multiple, axially parallel segments arranged spaced apart from each other in the circumference direction.

17. A device according to claim 1, wherein the pole shoe is comprised of a soft magnetic material.

18. A device according to claim 1, wherein the pole shoe is comprised of a soft ferritic ceramic oxide material.

19. A device according to claim 11, wherein the magnetic shield (42, 44) on the side of the coil opposite the pole shoe and at the coil outer surface is comprised of a soft magnetic material.

20. A device according to claim 1, wherein the pole shoe (34) exhibits a ring shaped centering shoulder or step concentric to the through hole (36) for receiving the free end of the socket part (12) and/or for supporting on the ring opening of the induction coil (26).

21. A device according to claim 1, wherein the induction coil (26) is comprised of coil windings (33) of a high frequency stranded wire.

22. A device according to claim 21, wherein the coil winding (33) is air cooled.

23. A device according to claim 1, wherein the induction coil (26) is in the form of a bobbin or coil body (32) and comprised of a ceramic material.

24. A device according to claim 1, wherein the socket part (12) includes a close-fitting borehole for receiving the tool shaft (14), which towards the free end communicates with a segment of larger diameter.

25. A device according to claim 1, wherein the socket part (12) includes a cylindrical or truncated conical outer surface (22).

26. A device according to claim 1, wherein the tool receptacle (10) includes a coupling piece (18) carrying the socket part (12) and connectable with a rotatable machine spindle.

27. A device according to claim 1, wherein the tool receptacle (10) and the induction coil (26) are moveable relative to each other.

28. A device according to claim 1, wherein the pole shoe (34) in the operating condition borders towards the tool shaft, a ring-shaped air gap.

29. A device according to claim 19, wherein the magnetic shield (42, 44) on the side of the coil opposite the pole shoe and at the coil outer surface is comprised of a soft ferritic ceramic oxide material.

* * * * *